Patented Mar. 25, 1924.

1,488,009

UNITED STATES PATENT OFFICE.

JAMES J. KIRBY, OF NEWARK, NEW JERSEY, ASSIGNOR, BY MESNE ASSIGNMENTS, OF ONE-HALF TO GENERAL OIL COMPANY OF NEW JERSEY, A CORPORATION OF DELAWARE.

SUBSTITUTE FUEL OIL.

No Drawing.    Application filed March 30, 1921.   Serial No. 457,019.

*To all whom it may concern:*

Be it known that I, JAMES J. KIRBY, a citizen of the United States, and a resident of Newark, in the county of Essex and State of New Jersey, have invented a certain new and useful Improved Substitute Fuel Oil, of which the following is a specification.

The invention relates to improvements in substitute fuel oils and has particular reference to a combination or mixture of divers substances for making a refined substitute gasoline for internal combustion motor uses.

One object of the invention consists in the providing of an inexpensive fuel oil made up of a plurality of divers ingredients all parts of which are applicable in a mixture to form an efficient substitute for gasoline, naphtha and other and like combustion fuel oils.

The invention consists in mixing together in a vat or other suitable receptacle in order to obtain a base for the reduction of substantially twenty-five gallons of finished product; 3 quarts of water, 2 ounces of glycerine, 2 ounces of soap, 3 pints of crude oil, (petroleum) 3 pints of gasoline, 2 quarts of kerosene, 1 pint of ammonia, 3 ounces of ether, 3 pints of naphtha, and 3 ounces of alum, the mixture is boiled and agitated during the boiling thereof, the resultant mixture is then allowed to stand and cool, the result of said composition being a semi-thick viscous base or mass to be thereafter diluted or broken up by the repeated addition of two parts of gasoline and one part of crude oil until the composition reaches the desired liquidity.

Heretofore compositions of substitute fuel oils contain high percentages of sediment and other foreign substances, together with large amounts of sulphur, and it is the object of this invention to obviate as much as possible this undesirable condition and fault in making fuel oils. In order to remove said foreign substances, and other harmful ingredients the mixture comprised in the structure as described is filtered through a bed of de-colorizing carbon held in suspension in suitable hoppers or filtration tanks, and after passing therethrough the fuel oil has extracted therefrom all or a substantial part of said foreign substances and other detrimental ingredients.

To further advance the efficiency of the recovered liquid fuel oil, the final mixture is filtered through a bed of de-colorizing carbon impregnated with or washed in a solution of sulphuric acid in order to remove from said mixture the discoloring ingredients, other foreign substances and a substantial part of the sulphur content thereof. By removing the foregoing detrimental ingredients from the final mixture a substitute fuel oil is recovered having a high proof body and one as efficient as all of the well known hydro-carbon fuel oils.

The manufacture of the fuel oil or the method of making same consists in combining water, crude oil, gasoline, kerosene, ammonia, naphtha, glycerine, soap, ether, and alum in the quantities specified, in order to produce a 2¾ gallon mixture of fuel oil base. Said base composition is brought to a boiling point in a suitable receptacle and allowed to cool or until same is topped. To the foregoing quantity namely 2¾ gallons, equal parts of a cheap and low proof gasoline and crude oil (petroleum) is added to break the mixture, or in actual quantity 22½ gallons, or 11⅛ gallons of gasoline and 11⅛ gallons of crude oil is added to produce a 25 gallon mixture of motor fuel. During filtration a small amount of the 25 gallons is lost in refining, but not enough to reduce the actual quantities recovered.

In carrying out my process I combine the component parts thereof in the quantities specified by mixing them in a suitable retort and heating the mixture to approximately 212 degree F., and then allowing the said mixture to cool. After the mixture cools it forms into a viscous mass and is allowed to remain in that form until its use is required. To break up the viscous mass I add equal parts of low test gasoline and crude oil in quantities sufficient to produce a fuel oil of the proper liquidity. To clarify the mixture I then pass the same through a suitable hopper having suspended therein a filter bed of a de-colorizing carbon which carbon may be impregnated with any well known clarifying acid, after which the liquid fuel is drawn therefrom or allowed to pass therefrom by gravity and conveyed to a suitable point of reclamation.

The invention as described and claimed may be made of the ingredients set forth or their equivalents and may be produced by other process, therefore, I do not limit the invention to specified substances nor the proportions thereof.

What I claim and desire to secure by Letters Patent of the United States is:—

1. A fuel oil comprising a fractional mixture of 3 quarts of water, 2 ounces of glycerine, 2 ounces of soap, 3 pins of crude oil, 3 pints of gasoline, 2 quarts of kerosene, 1 pint of ammonia, 3 ounces of ether, 3 pints of naphtha, and 3 ounces of alum boiled to a viscous consistency to cause said gasoline, ammonia, naphtha, and ether to evaporate therefrom, to provide a two and three quarter gallon mixture, and diluted with one part of crude oil and two parts of gasoline to provide a twenty five gallon mixture.

2. A fuel oil comprising a mixture of three quarts of water, two ounces of glycerine, two ounces of soap, three pints of gasoline, three pints of crude oil, two quarts of kerosene, one pint of ammonia, three ounces of ether, three pints of naphtha and three ounces of alum boiled to a viscous consistency to cause the fractional part of said gasoline, ammonia, naphtha, and ether to evaporate therefrom, to provide a two and three quarter gallon mixture, diluted with one part of crude oil and two parts of gasoline to provide a twenty five gallon mixture and filtered through a de-colorizing carbon to remove therefrom foreign substances.

In testimony whereof I have hereunto signed my name in the presence of two subscribing witnesses.

JAMES J. KIRBY.

Witnesses:
  E. B. LEDDEN,
  J. W. GOODING.